Nov. 13, 1951 — J. J. ALIKONIS — 2,574,948
ROTARY BEATER MILL AND CLASSIFIER FOR PRODUCING SIEVE RANGE SIZED CHOCOLATE PRODUCTS
Filed March 26, 1949
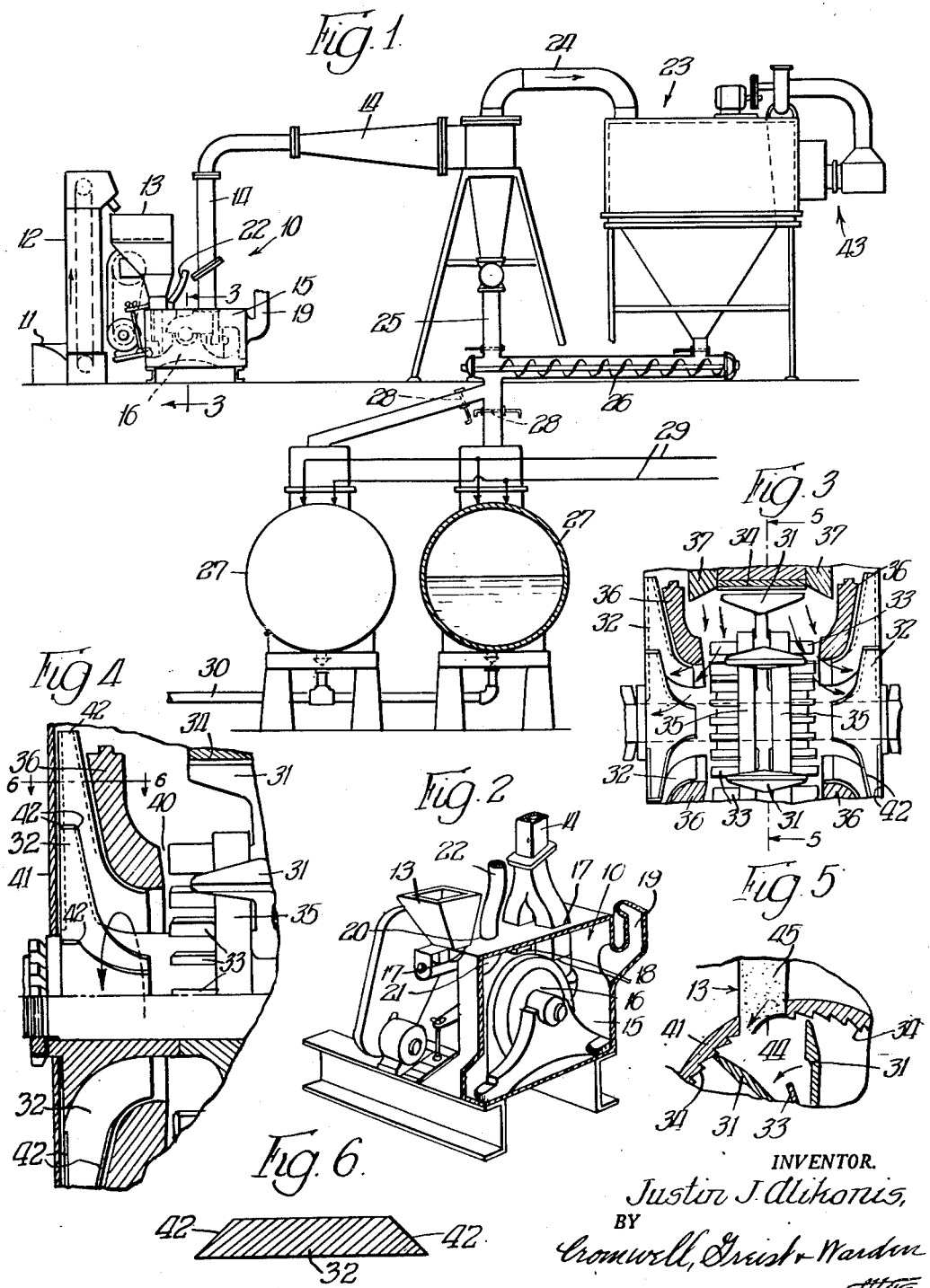
INVENTOR.
Justin J. Alikonis,
BY
Cromwell, Greist & Warden
Attys.

Patented Nov. 13, 1951

2,574,948

UNITED STATES PATENT OFFICE 2,574,948

ROTARY BEATER MILL AND CLASSIFIER FOR PRODUCING SIEVE RANGE SIZED CHOCOLATE PRODUCTS

Justin J. Alikonis, Bloomington, Ill., assignor to Paul F. Beich Company, Bloomington, Ill., a corporation of Illinois Application March 26, 1949, Serial No. 83,678

2 Claims. (Cl. 241—52)

1

This is a continuation-in-part of my copending application filed May 19, 1947, Serial No. 748,864, for Method of Making Chocolate Confectionery, now matured into Patent 2,465,828, of March 29, 1949.

The present invention relates to a chocolate confectionery possessing superior qualities of taste, texture and aroma, and to an apparatus for producing the same.

It is a general object of the invention to provide a chocolate making apparatus, wherein all of the dry ingredients of the chocolate are ground and pulverized to an exceedingly fine particle size in a single abrasive and scarifying type of pulverizing operation under conditions which preclude substantial liquefying or gumming of any of said ingredients, and in particular of the cacao nibs which are the basic ingredient of the chocolate product.

A further object is to provide an apparatus for manufacturing chocolate which eliminates need for multiple grinding procedures to process the cacao nibs by reducing them to a viscous liquid or semi-plastic consistency, commonly known as chocolate liquor, and in which the nibs are ground and pulverized in a single operation, along with all other dry ingredients, to an exceedingly fine particle size.

A still further object is to provide an apparatus for chocolate confectionery manufacture which is notable for the savings in equipment, space, labor and power which it makes possible, while producing a chocolate product of exceedingly fine quality, definitely superior to that of chocolate confections produced by existing, multiple grinding procedures.

Yet another and more specific object is to provide an apparatus whereby the dry ingredients, particularly including the basic cacao nibs, are mixed and successively ground to exceedingly fine and uniform particle size by an abrading and scarifying action, in which the pulverizing step is carried out at a lowered temperature and under controlled air supply conditions, so as to enable the reduction of the cacao nibs without liquefying the same and objectionably clogging or gumming the pulverizer.

A still further object is to provide an improved chocolate making apparatus whereby dry ingredients are reduced to a substantially uniform

2 particle size by a single air flotation-centrifugal pulverizing action, in which apparatus novel provisions are made to control said particle size with the object of increasing production output and improving the quality of the product, particularly as regards its tendency to "bloom."

Another object is to provide an apparatus of the sort referred to in the preceding paragraph in which the ultimate ground particles are reliably controlled in size to fall within the sieve range.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a schematic or diagrammatic view illustrating a commercial system for performing the process of the invention in a continuous, as distinguished from a batch, operation;

Fig. 2 is a fragmentary perspective view, further illustrating certain special provisions for supplying the pulverizing equipment of the apparatus with a conditioned and cooled air supply;

Fig. 3 is an enlarged fragmentary view in vertical transverse section through the grinder housing of the apparatus on a line generally corresponding to line 3—3 of Fig. 1;

Fig. 4 is a fragmentary view generally similar to Fig. 3 illustrating more clearly certain novel provisions with regard to the rotating unit of the grinder which are made to enable accurate control of particle size;

Fig. 5 is a schematic fragmentary view in vertical transverse section along a line corresponding to line 5—5 of Fig. 3, illustrating certain provisions to perfect the grinding operation in accordance with the invention; and Fig. 6 is an enlarged view through one of the fan blades of the apparatus, being along section line 6—6 of Fig. 4.

In my Patent No. 2,459,908 of January 25, 1949 I illustrate and describe an improved method for manufacturing chocolate confectionery wherein the dry ingredients, excepting the basic cacao nib ingredient of the ultimate chocolate product, are ground to an extremely fine particle size in a single grinding and pulverizing operation. As pointed out in detail therein, this improvement eliminates much of the time-honored, multiple phase equipment including grinding mills, melangeurs, refiners and conches, or equivalent particle reducing and mixing apparatus which has been relied on heretofore in the production of fine chocolate confections.

The different varieties and grades of cacao beans contain different percentages of cacao fat in the nibs, but they seldom contain less than 50% by weight of cacao fat. This high content of cacao fat, plus its low melting point (i. e., in the neighborhood of 86–89° F.), has prevented the grinding of the nibs in centrifugal, air flotation and hammer type grinders. The operation of such pulverizers involves the centrifugal flowing of the ground material in opposition to a fan-created air stream in the pulverizer housing, separating, recirculating and regrinding the insufficiently ground particles by reason of a balanced reaction of their centrifugal force and aerodynamic force, while smaller particles which meet size requirements are discharged from the mill. However, the treatment of cacao nibs in installations of this type has not been practical heretofore, because of the tendency of the cacao fat to melt and to clog or gum the abrasion machinery. Hence, grinding of the cacao nibs has heretofore been accomplished exclusively by the multiple phase, progressive size reduction operations referred to above.

I have found that, under controlled conditions of roast of the cacao nibs and of their moisture content and of the temperature and humidity of the atmosphere in the pulverizer housing, a mixture of all the dry ingredients of the desired chocolate confectionery, including the cacao nibs, can be successfully pulverized continuously and without clogging in a pulverizer of the type referred to above. The result is an extremely fine powder, which, when subsequently mixed with the liquid confectionery ingredients, produces a superior chocolate or chocolate coating without further processing.

In performing the method, the cacao beans are roasted to a medium or medium high roast in continuous roasters enabling a positive control, in operation. Of course, the conditions of a given exact roast will depend to a considerable extent on the variety, grade and blend of cacao nibs used, but I contemplate that the moisture content of the cacao nibs not be over 3.8% at any time, since moisture toughens the cacao nibs. A medium or medium high roast normally yields a cacao nib that is crisp and brittle and has a fine chocolate flavor and aroma, readily distinguishable from low roasted nibs which are tougher and lack the fine flavor and aroma.

In order to achieve the desired results of controlling the moisture content, dry, cool air is preferably used at all times to cool the roasted nibs and in conveying the same to the pulverizer for processing; and maintenance of controlled conditions of temperature and humidity throughout the pulverization operation is an essential feature of the invention, as will appear.

A suitable pulverizer, together with supply and discharge equipment for the purpose of the invention, is illustrated in the drawings. The reference numeral 10 in general designates a conventional screenless hammer type pulverizer normally adapted to produce a product of a particle size of from 1 to 25 microns. This pulverizer, which is of a standard manufacture, designated "Mikro-Atomizer," the product of the Pulverizer Machinery Company, of Summit, New Jersey, operates on the basic principle of separating and recirculating the ground particles in a pulverizer housing by a balanced reaction of centrifugal force and air flotation or aerodynamic drag, as pointed out above, so that the larger sizes are retained in the grinding section of the mill as long as is required for their ultimate reduction to desired particle size.

Certain structural details of pulverizer 10 are hereinafter referred to in connection with the description of the present improvements which particularly deal with control of particle size. Generally, in operation, referring to Figs. 2 and 3, the ground material in the pulverizer housing 16 is thrown by centrifugal force into the path of an annular series of individually pivoted, rotating hammers 31, in opposition to an air stream created by a built-in rotary fan 32. Said stream travels radially inwardly of the housing and exits axially through the blades of said fan in the direction indicated by arrows in Fig. 3 to expel the particles into a discharge duct 14. In so traveling, the particles are struck by the separator blades 33 which rotate with the fan blades, and are centrifugally thrown radially outwardly by said separator blades. The greater centrifugal force of the larger and coarser particles overcomes the radial inward air drag tending to expel the same from the housing, and returns them into the path of hammer impact against the grinding surface 34. The air drag on the smaller particles overcomes their centrifugal force and delivers them axially from the housing. The point of balance between these two opposing forces, and therefore the control of the maximum size of the delivered pulverized particles, is readily regulated by control of velocity of the fan-created air stream. The structural features of the aerodynamic pulverizer unit 10, such as the hammer carrying rotor 35, dispersion rings 36, deflector rings 37 and fans are well known to those skilled in the art, hence require no further description.

The dry materials of the chocolate composition, including prepared roasted and cooled cacao nibs, sugar, salt, dry milk powder and the like, are charged to the hopper 11 of a mechanical bucket type elevator 12 associated with the pulverizer, from which they are discharged to the storage hopper 13 of the latter. This pulverized product is blown upwardly and laterally into discharge duct 14.

In order to maintain the desired temperature and humidity conditions throughout the operation of pulverizing the cacao nibs and other dry ingredients, I preferably enclose the pulverizer in a casing 15 which surrounds the pulverizer housing 16, in the manner illustrated in Fig. 2. Supply hopper 13 discharges through the casing 15 to the intake side of the pulverizer housing and said casing 15 is appropriately sealed, as indicated at 17, around hopper 13 and around the joint of discharge duct 14 with the casing. Said duct is forked at its lower end for association with the dual discharge throats 18 of pulverizer 10.

Casing 15 is supplied internally with conditioned cooling air through a duct 19 opening in one side thereof, said duct being in turn connected to a source of suitably refrigerated air of any conventional nature, which it is not believed necessary to describe. The materials being reduced in the pulverizer are to be maintained at a temperature below that which would result in substantial liquefication of the cocoa butter in the nibs. The make-up of the mix of materials entering the pulverizer determines the maximum permissible temperature. For example, for a milk chocolate composition having, say, 10% chocolate nib component, a temperature of 78° F. is acceptable; but for a chocolate compound having a higher percentage of nibs, for example, up to 35%, a lower temperature of about 68° F. is required. Accordingly, provision is made to supply an adequate volume of air through duct 19 to maintain the pulverizer parts at or below said temperature, in conjunction with other provisions to be described. Suitable vaned openings in the pulverizer housing 16 admit conditioned air from the casing interior to the materials being reduced by the pulverizer. Such cooling of the atmosphere surrounding the pulverizer and of the air entering its housing inhibits melting of the cocoa fat content of the nibs and maintains the nib particles in an appropriately dry condition, corresponding to the condition of the other dry ingredients, for their successful reduction to desired particle size and discharge by the pulverizer 10.

An auxiliary air opening 20 is provided in the top of casing 15, which leads to a supplemental air intake 21 of the pulverizer and is also communicated with a supply or source of cool dry air (not shown) as by a duct 22. This furnishes air with the incoming charge of dry ingredients to control their temperature and humidity, and in general facilitates the feeding thereof to the pulverizer.

The remainder of the apparatus is generally similar to that illustrated and described in my patent referred to above, comprising a standard type automatic dust collector 23 through which a certain percentage of the finer particles of the output of the pulverizer is delivered through a duct 24. These particles are collected and returned to the discharge conduit 25, which also receives the discharge of duct 14, by a screw conveyor 26. The ground dry ingredients are discharged selectively into the Stehling tanks or other appropriate mixing and storage equipment 27 under the control of the shutter type valves 28. There they are mixed with measured quantities of liquid ingredients, such as flavoring, lecithin and the like through supply lines which are diagrammatically illustrated and designated by the reference numeral 29. The mix is withdrawn as desired through the pipes 30.

Cacao nibs which are handled under a controlled condition of restricted moisture content are crisp and easily broken up into very minute pieces which, when introduced in a mixture with other dry ingredients in a refrigerated atmosphere, lend themselves to efficient and rapid reduction in the pulverizer 10. The nibs may in fact be preliminarily reduced in size to a considerable degree in the standard cracker and fanner wherein certain husking or winnowing steps are performed. The refrigerated atmosphere wherein final pulverizing along with the other dry ingredients is later carried out allows for the rupturing of the fat cells of the cacao nibs with very little, if any, melting of the fat content. As a result, the nibs are reduced to minute particle size while maintaining the form of a dry, fine powder capable of passing through the pulverizer 10 continuously without clogging.

While the normal operating temperature in an uncooled pulverizer of the type under consideration may reach 115° F. or higher, which is sufficiently hot to quickly reduce the apparatus to inoperativeness if handling cacao nibs, a cooling of the pulverizer to 89° F. or lower will result in continuous efficient production. However, as stated above, cooling to a point below the melting point of the cocoa fat is contemplated by the invention.

The above considerations pertain to the production of a ground mass of dry confectionery ingredients which are of extremely small, sub-sieve particle size, i. e., within the range of 37 microns or less. It has heretofore been considered highly important, in the production of a chocolate coating having a velvety texture and smoothness, to reduce the particle size of its ingredients, or a large percentage thereof, to sub-sieve size, namely, to pass a 400 mesh screen. The above described apparatus amply fulfills this requirement.

Inasmuch as the normal human palate loses its ability to detect particle sizes in the neighborhood of 100 microns, it is evident that a commercially acceptable product can be manufactured without the need for the extreme degree and thoroughness of particle size reduction which are involved in the operation of the apparatus described above. In fact, certain valuable advantages are had by limiting the degree to which the fineness of pulverization is carried. For example, the tremendous increase in exposed surface area of a ground mass which results from reduction of the particles to impalpable size tends to increase the viscosity of a chocolate, which in turn results in the required use of more cocoa butter to lower the viscosity. This produces a chocolate of a higher fat content and, inevitably, more susceptible to fat "blooming." This is objectionable in confections for known reasons.

Moreover, a grinding in which the particles of the dry ingredients are reduced to sub-sieve sizes substantially reduces the production output of the grinding machinery, in fact as much as 50%. This occasions an added and, as I have discovered, unnecessary cost because of power and labor consumption.

The present invention therefore further includes provisions such as are illustrated in Figs. 4, 5 and 6 to enable, if desired, the control of the particle size so that the preponderance of the ground mass exceeds in size the sub-sieve range of sizes. I have discovered that, by modifying the internal structure of the grinding unit and by observing certain definite rules in the operation thereof, a very satisfactory coating may be produced, which is not subject to the objection of greatly multiplied exposed surface area of a sub-sieve product and, furthermore, which may be produced much more economically as regards the factors of raw material, labor and power cost. These modifications of the apparatus enable me to produce a ground mass of dry ingredients, whether inclusive of the dry cacao nibs or not, in which 100% will pass a 100 mesh screen, 97% a 200 mesh screen, and 85% to 95% a 325 mesh screen. In obtaining this result I revise the structure and operation of the grinding unit illustrated in Fig. 3 in the following fashion:

(a) By diminishing the centrifugal force exerted by separator blades 33 on the particles to return the same radially outwardly. This is done by decreasing the speed of rotation of said blades, which of course similarly drops the speed of rotation of the hammers 31. Such reduction of speed insures that ground particles will escape from the housing in the air stream before the great bulk thereof is reduced to sub-sieve size. In an actual installation of a No. 6 "Mikro-Atomizer" unit, the manufacturer's rate of speed of 6000 R. P. M. was dropped to 5000 R. P. M.

(b) To the same end, the number of separator blades 33 has been reduced by two-thirds, for example, from 24 in the unit referred to to 8, the distribution of the blades being kept uniform to insure proper balance in rotation;

(c) The lateral spacing of the separator blades 33 from dispersion ring 36, indicated by the reference numeral 40, has been materially increased. In the conventional unit referred to this dimension is .030 inch; in the revised installation in question the spacing is increased to .035 inch or greater, up to 0.50 inch;

(d) The velocity of the radially inwardly and axially outwardly flowing air stream, indicated by arrows in Fig. 3, has been substantially increased. This is accomplished by increasing the number of blades of the rotary fan 32. In the modified installation the number has been doubled;

(e) In order to prevent any tendency of particles to adhere to one another if caught between the dispersion ring 36 and fan 32, or between said fan and the housing wall 41, which tendency is particularly noticeable in grinds greater than sub-sieve sizes, it has been found desirable to shape the fan blades to impart a rearward bevel or taper to the sides thereof, as indicated in Figs. 4 and 6 by the reference numeral 42. This enables any particle caught by the revolving fan blade to free itself and fall into the air stream or into the path of the succeeding blade, without adhering to another particle or to the housing or dispersion ring. Thus the building up of any masses which would affect the clearance between the ring, housing and fan blades, with resultant subtractive effect on the air stream or overloading of the fan, is avoided;

(f) A predetermined, though regulable, negative pressure of, say, from one inch to six inches of water, is maintained in the dust collector 23 or other equivalent unit of the installation. This is accomplished by the fan or blower unit 43 shown in Fig. 1. Exiting of the sieve size particles from the grinding housing is thus further facilitated;

(g) It has been found advantageous to insure a purely tangential flow of ingredients into the path of the hammers 31 of the grinding unit. For this purpose I mount a small deflector 44 in the discharge throat 45 of the hopper 13 (as shown in Fig. 5) to restrict radial feed of the incoming material between the hammers 31. Increased production results due to the more efficient action of said hammers in conjunction with the grinding surface 34.

All of the above factors cooperate to enable an accurate and predetermined control of particle size from sub-sieve to sieve size range when desired. I find that the product having particles in the latter range is characterized by extreme uniformity of distribution of the particle sizes, i. e., there is no great preponderance of very small particles as compared with the number of substantially larger particles. This evenness of distribution contributes to the production of a fine velvety chocolate in a one-step dry ingredient grinding operation, notwithstanding the fact that extremely fine, impalpable, sub-sieve particle sizes are avoided. Material savings in power and labor consumption are had. A lowering of the percentage of cocoa butter necessary to be added to the product is effected and the tendency of the product to "bloom" is diminished.

The ground mass has good wettability (up to 60% improved) and dispersibility. When added immediately and continuously to the liquid ingredients following grinding, it disperses quickly and thoroughly therein, without cohesion or agglomeration. Thus loss of the initial particle size characteristics during the liquid mixing phase is avoided.

I claim:

1. In air flotation type confectionery grinding apparatus characterized by a housing having a fixed grinding surface, coaxially rotatable hammers and deflector blades in said housing acting respectively to grind confectionery particles against said surface and to return particles centrifugally thereto for regrinding, and a multiple blade fan rotating between the housing and a fixed dispersion surface to create an air stream acting to discharge reground particles in opposition to the centrifugal force, the improvement to maintain the preponderance of ground particles in a size incapable of passing a 400 mesh screen while insuring that all thereof will pass a 100 mesh screen, comprising a rearwardly relieved surface on the radially extending sides of said fan blades to prevent clogging of particles between the blades and said housing and dispersion surface, means to cool the interior of said housing, a source of vacuum connected to the discharge of said housing, said housing having a material intake duct opening in a substantially radial relation to the hammer axis, and means positioned to extend transversely of the material intake duct at its point of discharge to said housing to direct particles to be ground in a direction tangential to the arc of said hammers.

2. In air flotation type confectionery grinding apparatus characterized by a housing having a fixed grinding surface, coaxially rotatable hammers and deflector blades in said housing acting respectively to grind confectionery particles against said surface and to return particles centrifugally thereto for regrinding, and a multiple blade fan rotating between the housing and a fixed dispersion surface to create an air stream acting to discharge reground particles in opposition to the centrifugal force, the improvement to maintain the preponderance of ground particles in a size incapable of passing a 400 mesh screen while insuring that all thereof will pass a 100 mesh screen, comprising a rearwardly relieved surface on the radially extending sides of said fan blades to prevent clogging of particles between the blades and said housing and dispersion surface, said housing having a material intake duct opening in a substantially radial relation to the hammer axis, and means positioned to extend transversely of the material intake duct at its point of discharge to said housing to direct particles to be ground in a direction tangential to the arc of said hammers.

JUSTIN J. ALIKONIS.

(References on following page)

REFERENCES CITED

The following references are of record in the file of this patent:

UNITED STATES PATENTS

| Number | Name | Date |
|---|---|---|
| 201,347 | Hyatt | Mar. 19, 1878 |
| 441,951 | Goetz | Dec. 2, 1890 |
| 1,055,686 | Williams | Mar. 11, 1913 |
| 1,076,924 | Thurmann | Oct. 28, 1913 |
| 1,381,266 | Andrews | June 14, 1921 |
| 1,591,979 | Iff | July 13, 1926 |
| 1,725,155 | McAllister | Aug. 20, 1929 |
| 1,813,086 | Sahmel | July 7, 1931 |
| 1,971,314 | Lauenstein | Aug. 21, 1934 |
| 2,013,800 | Daniels | Sept. 10, 1935 |
| 2,013,808 | Robinson | Sept. 10, 1935 |
| 2,091,297 | Ximenez | Aug. 31, 1937 |
| 2,208,919 | Winter et al. | July 23, 1940 |

OTHER REFERENCES

Modern Machines for Dry Size Reduction in Fine Size Range, by C. E. Berry, Industrial and Engineering Chemistry, July 1946, pages 672–676.

Mikro-Pulverizer, Mikro-Atomizer Catalogue of Pulverizing Machinery Company, Chatham Road, Summit, New Jersey, printed November 1946, 47 pages, cover, page 1, page 39, page 43, page 44 particularly pertinent. Library designation "T J 1345, p. 9, 1946."